US008433202B2

(12) United States Patent
Way (10) Patent No.: US 8,433,202 B2
(45) Date of Patent: Apr. 30, 2013

(54) 40, 50 AND 100 GB/S OPTICAL TRANSCEIVERS/TRANSPONDERS IN 300PIN AND CFP MSA MODULES

(75) Inventor: Winston I Way, Irvine, CA (US)

(73) Assignee: Neophotonics Corporation, San Jose, CA (US)

( * ) Notice: Subject to any disclaimer, the term of this patent is extended or adjusted under 35 U.S.C. 154(b) by 356 days.

(21) Appl. No.: 12/783,989

(22) Filed: May 20, 2010

(65) Prior Publication Data

US 2010/0322632 A1    Dec. 23, 2010

Related U.S. Application Data

(60) Provisional application No. 61/242,807, filed on Sep. 16, 2009, provisional application No. 61/186,325, filed on Jun. 11, 2009, provisional application No. 61/179,956, filed on May 20, 2009.

(51) Int. Cl.
*H04B 10/00* (2006.01)

(52) U.S. Cl.
USPC ............. 398/158; 398/79; 398/154; 398/160; 398/183

(58) Field of Classification Search ............ 398/135, 398/138, 140, 79, 158, 159, 182, 183, 186–188, 398/154, 160
See application file for complete search history.

(56) References Cited

U.S. PATENT DOCUMENTS

| | | | | |
|---|---|---|---|---|
| 6,532,320 B1 * | 3/2003 | Kikuchi et al. | ................... | 385/24 |
| 6,559,996 B1 * | 5/2003 | Miyamoto et al. | ............ | 398/183 |
| 7,215,892 B2 * | 5/2007 | Lee et al. | ...................... | 398/183 |
| 7,224,907 B2 * | 5/2007 | Lee et al. | ...................... | 398/186 |
| 7,860,400 B2 * | 12/2010 | Cole | .............................. | 398/155 |
| 8,223,768 B2 * | 7/2012 | Handelman | ................... | 370/391 |
| 8,340,123 B2 * | 12/2012 | Barbieri et al. | ............... | 370/466 |
| 2002/0033984 A1 * | 3/2002 | Yonenaga et al. | ............ | 359/180 |
| 2003/0067652 A1 * | 4/2003 | Harada et al. | ................ | 359/133 |

(Continued)

OTHER PUBLICATIONS

International Search Report and Written Opinion dated Dec. 24, 2010, and issued in corresponding International Application No. PCT/US2010/001483.

(Continued)

*Primary Examiner* — Daniel Washburn
*Assistant Examiner* — Hibret Woldekidan
(74) *Attorney, Agent, or Firm* — Buchanan Ingersoll & Rooney PC (57) ABSTRACT

Disclosed by way of exemplary embodiments, a 40/50/10 Gb/s Optical Transceivers/transponders which use opto-electronic components at data rates collectively that are lower than or equal to half the data rate, using two optical duobinary carriers. More specifically, the exemplary embodiments of the disclosed optical transceivers/transponders relate to a 43 Gb/s 300 pin MSA and a 43~56 Gb/s CFP MSA module, both include a two-carrier optical transceiver and the appropriate hardware architecture and MSA standard interfaces. The two-carrier optical transceiver is composed of a pair of 10 Gb/s optical transmitters, each using band-limited duobinary modulation at 20~28 Gb/s. The wavelength channel spacing can be as little as 19~25 GHz. The same principle is applied to a 100 Gb/s CFP module, which is composed of four tunable 10 Gb/s optical transmitters, with the channel spacing between optical carriers up to a few nanometers.

31 Claims, 9 Drawing Sheets

U.S. PATENT DOCUMENTS

| | | |
|---|---|---|
| 2004/0071473 A1 | 4/2004 | Lee et al. |
| 2004/0096225 A1 | 5/2004 | Lee et al. |
| 2005/0084269 A1* | 4/2005 | Dallesasse et al. ........... 398/135 |
| 2005/0135816 A1 | 6/2005 | Han et al. |
| 2007/0196111 A1 | 8/2007 | Shang |
| 2008/0063396 A1 | 3/2008 | Yu et al. |
| 2008/0089693 A1* | 4/2008 | El-Ahmadi et al. ........... 398/135 |
| 2008/0095541 A1* | 4/2008 | Dallesasse .................... 398/191 |
| 2010/0021166 A1* | 1/2010 | Way ............................... 398/79 |

OTHER PUBLICATIONS

Reference Document for "300pin 40Gb transponder," Public Document Edition 3, Jul. 19, 2002, www.300pinmsa.org, pp. 1-58.
CFP MSA Draft 1.0, Mar. 23, 2009, pp. 1-52.
Xu et al., "Spectral Efficient Transmission of 40Gbps per Channel Over 50GHz Spaced DWDM Systems Using Optical Carrier Suppression, Separation and Optical Duobinary Modulation", paper NTuC2, Optical Fiber Communications Conference, 2006, pp. 1-10.

* cited by examiner

40, 50 AND 100 GB/S OPTICAL TRANSCEIVERS/TRANSPONDERS IN 300PIN AND CFP MSA MODULES

RELATED APPLICATIONS

This application claims benefit of U.S. Provisional Patent Application No. 61/242,807 entitled "40, 50, and 100 Gb/s Optical Transceivers/Transponders in 300 pin and CFP MSA Modules," filed on Sep. 16, 2009, U.S. Provisional Patent Application No. 61/179,956, entitled "Optical Network Architecture and Apparatus for High Capacity Upgrade" filed on May 20, 2009 and U.S. Provisional Patent Application No. 61/186,325, entitled "Part Two of 'Optical Network Architecture and Apparatus for High Capacity Upgrade,'" filed Jun. 11, 2009, each herein incorporated by reference in their entirety for all purposes.

DESCRIPTION OF THE RELATED ART

The present disclosure relates to optical communications based on optical wavelength division multiplexing (WDM).

BACKGROUND OF THE INVENTION

Current commercially available 40 Gb/s 300 pin modules such as described in 300 pin MSA Group, Reference Document for "300 pin 40 Gb Transponder," Public Document Edition 3, Jul. 19, 2002, found on the world wide web at 300pinmsa.org, use direct detection methods. These transponders are mostly based on four modulation formats: (a) 40 Gb/s NRZ (non-return-to-zero), (b) 40 Gb/s duobinary, (c) 40 Gb/s differential phase-shift-keying (DPSK), and (d) 2×20 Gb/s differential quadrature phase-shift-keying (DQPSK). 40 Gb/s NRZ has a severe dispersion-limited transmission distance of around 2~10 km and is usually for short-distance "client-side" applications. 40 Gb/s duobinary modulation was used in the first-generation long-haul transmission systems, but has a severe limitation in terms of both poor chromatic dispersion (CD) and polarization mode dispersion (PMD) tolerance, 40 Gb/s DPSK and 2×20 Gb/s DQPSK both exhibit good optical signal-to-noise ratio (OSNR) performance. DPSK has limited CD and PMD tolerance, while DQPSK improves both CD and PMD tolerance by halving the symbol rate. However, DQPSK requires much more complicated structure than DPSK, duobinary, and NRZ, and therefore has a higher cost. 40 Gb/s DPSK and 2×20 Gb/s DQPSK require thermally-tuned phase demodulator. 40 Gb/s duobinary, 40 Gb/s DPSK, and 2×20 Gb/s DQPSK require thermally-tuned optical dispersion compensator. These thermally-tuned devices are all very slow, with a tuning time in the range of tens of seconds. As a result, none of these modulation formats are suitable for a ROADM (reconfigurable optical add-drop multiplexing)-based optical network, which needs to re-configure wavelengths dynamically and a fast traffic recovery time.

Another modulation technique is 2×20 Gb/s bandlimited-optical duobinary (BL-ODB). 2>20 Gb/s BL-ODB was proposed in J. Yu, et al., "Optical subchannels from a single lightwave source," U.S. Patent Publication No. US2008/0063396 A1, published Mar. 13, 2008, and in L. Xu et al., "Spectral Efficient Transmission of 40 Gbps per Channel over 50 GHz Spaced DWDM Systems Using Optical Carrier Suppression, Separation and Optical Duobinary Modulation," paper NTuC2, Optical Fiber Communications Conference, 2006. In these systems, both the optical modulator and photodetector use complex 40 Gb/s components.

The concept of using structurally simpler and more common 10 Gb/s opto-electronic components for 40 Gb/s duobinary data was apparently first proposed in H. L. Lee et al., "Duobinary Optical Transmitter", as disclosed in related U.S. Pat. No. 7,215,892 B2, issued May 8, 2007 and U.S. Pat. No. 7,224,907 B2, issued May 29, 2007.

From packaging perspective, although it is challenging to fit multiple opto-electronic components into a 40 Gb/s 300 pin MSA module, it is even more challenging to fit those opto-electronic components in a much smaller space offered by CFP MSA module as specified in CFP Draft 1.0, Mar. 23, 2009.

The C (Latin letter C for 100 or centum) form-factor pluggable (CFP) is from a multi-source agreement (MSA) for a standard common form-factor for high-speed transmission digital signals. The CFP supports 100 Gb/s and 40 Gb/s using 10 and 4 lanes in each direction (Rx and Tx), respectively, with 10 Gb/s in each lane.

SUMMARY OF THE INVENTION

Disclosed herein is a modulation technique and an apparatus embodying the same that offers even lower cost than currently commercially available duobinary and DPSK 300 pin transponders, and yet with comparable system performance as DQPSK 300 pin transponders. This modulation technique, 2×20 Gb/s bandlimited-optical duobinary (Dual BL-ODB) modulation, uses only a pair of 10 Gb/s optical modulators in the optical modulators to achieve 40, 50 Gb/s transmission rates, and two pairs of 10 Gb/s optical modulators to achieve 100 Gb/s transmission rates. It offers the smallest possible form factor for 40, 50, and 100 Gb/s transmission rates. The modulation technique also allows fast traffic recovery in an optical network with dynamic wavelength switching and routing.

The presently disclosed exemplary transceiver combines the 20~28 Gb/s BL-ODB modulation technique and 10 Gb/s opto-electronic modulation components to achieve the best balance between cost and performance for 40/50/100 Gb/s transmission. Further, the presently disclosed transceivers/transponders can use existing IC chips with appropriate hardware interfaces to accommodate this modulation technique.

By using the recently developed 10 Gb/s tunable Transmitter Optical SubAssemblies (TOSAs) (which require a much smaller volume than conventional Integrated Tunable Laser Assemblies (ITLAs)) based on semiconductor Mach-Zehnder modulators, it is possible to fit all opto-electronic components in a line-side and in some applications client-side CFP transceiver module carrying 40 Gb/s and 100 Gb/s capacity.

DETAILED DESCRIPTION OF THE INVENTION

Various aspects and exemplary embodiments of the present disclosure are now described with reference to the drawings. In the following description, for purposes of explanation, numerous specific details are set forth in order to provide a thorough understanding of one or more aspects. It may be evident, however, that such aspect(s) may be practiced without these specific details.

The term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects or features will be presented in terms of systems that may include a number of devices, components, modules, and the like. It is to be understood and appreciated that the various systems may include additional devices, components, modules, etc. and/or may not include all of the devices, components, modules, etc., discussed in connection with the figures. A combination of these approaches may also be used.

Disclosed herein, for the first time, is how to combine appropriate hardware chips and interfaces (e.g., SFI5.1, 4×XFI, 10×XFI, etc.) with multiple carriers duobinary optical transceivers/transponders, with each optical carrier carrying 20~28 Gb/s data stream, to achieve a transceiver/transponder capacity of approximately 40 Gb/s, 50 Gb/s, and 100 Gb/s. Each 20~28 Gb/s optical carrier requires only a 10 Gb/s optical modulator in the transceiver, with or without a receiver electronic equalizer operating at 20~28 Gb/s for duobinary modulation. Consequently, a 40 Gb/s optical transceiver is composed of only two fixed or tunable wavelength 10 Gb/s transmitters (TXs) in the transceiver, and a 100 Gb/s optical transceiver is composed of only four fixed or tunable wavelength 10 Gb/s optical TXs.

When the channel spacing between optical carriers is as narrow as 19~25 GHz, the size of the receiver-side 1×2 array-waveguide (AWG), which is used to separate two narrowly spaced optical carriers, may be too costly or sometimes too big to fit into a CFP module. In that case, the AWG device is pushed outside the CFP module and used instead as a de-interleaver located between a transmission link and conventional 40-ch or 80-ch DWDM demultiplexers. A optical architecture using a 1×2 AWG slicer as the de-interleaver are disclosed in U.S. Provisional Patent Application No. 61/179,956, May 20, 2009 and U.S. Provisional Patent Application No. 61/186,325, Jun. 11, 2009, both herein incorporate by reference in their entirety for all purposes.

Exemplary Configurations

Figure 1A:
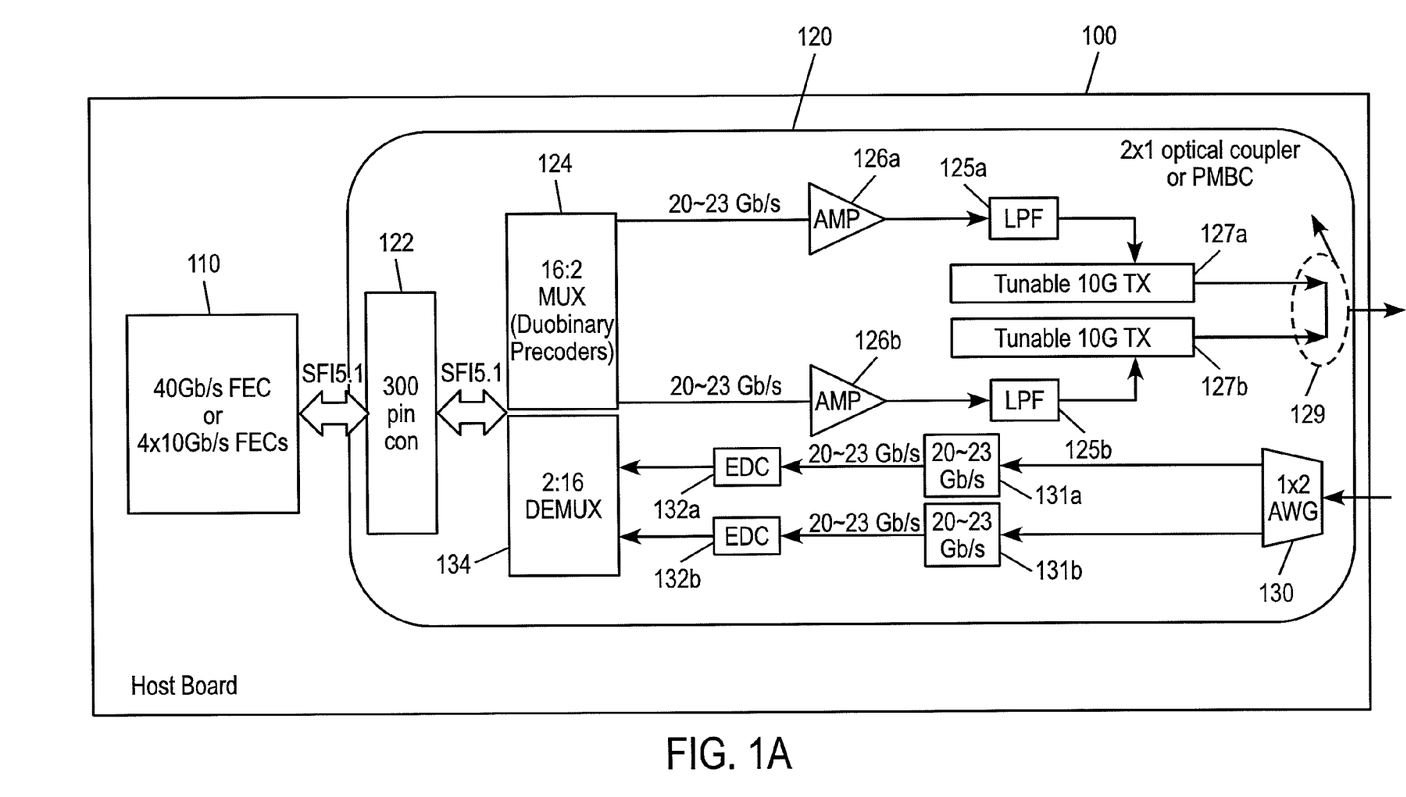
FIG. 1A illustrates exemplary 300 pin 2×(20~23) Gb/s modules described herein, and shows that the duobinary encoder(s) can be implemented within or after the 16:2 multiplexer.
Figure 1B:
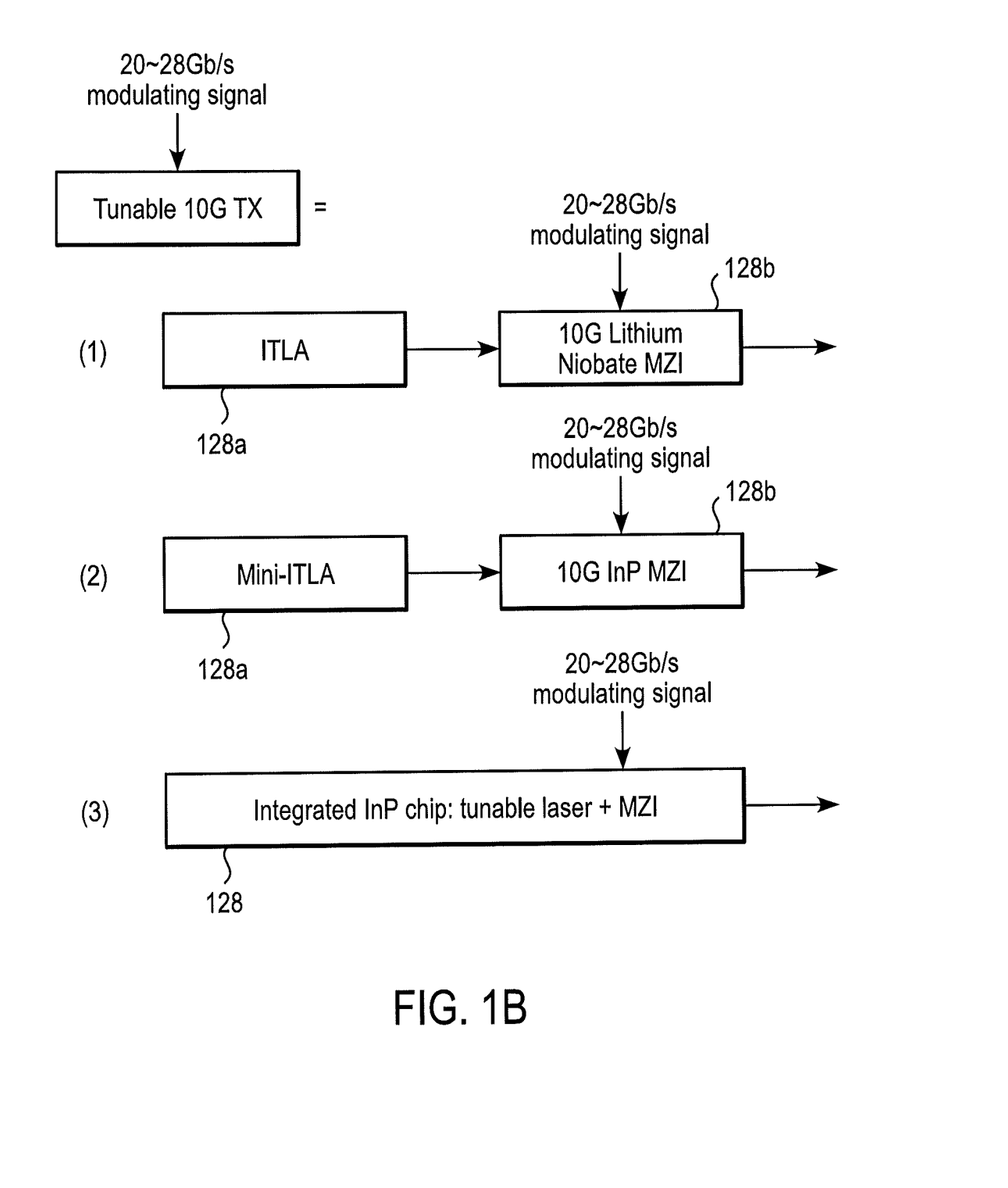
FIG. 1B illustrates the different possibilities of the "Tunable 10 G TX" as employed in the various exemplary embodiments.

FIGS. 1A and 1B show exemplary hardware and optical configurations of a 40 Gb/s 300 pin transceiver module. As illustrated, on a host board 100 are mounted an external 40 Gb/s FEC chip 110 electrically connected via a standard SFI5.1 connector to a 300 pin 2×(20~28) Gb/s module 120. Within the module 120 is a 300 pin connector 122, which connects to the external FEC chip 110 via the SFI5.1SFI5.1 interface. The FEC chip 110 in turn is connected to a 16:2 multiplexer (MUX) 124, which has a duobinary precoders in this exemplary embodiment, and has sufficient electronic buffer to manage the skew between the two 20~28 Gb/s lanes. Note that a duobinary precoder sometimes is termed a "differential encoder". If the MUX 124 does not have a duobinary precoder, then an external precoder is used immediately after the MUX 124. The MUX 124 separates the 40~46 Gb/s signal into two 20~28 Gb/s differentially encoded NRZ signals, each separately amplified in driver amps 126a and 126b, then passing through low pass filters (LPFs) 125a, 125b (which can be separate filters or different ports of the same LPF). Each LPF serves as a duobinary encoder. Alternatively, the LPF filters 125a, 125b can come first, and the low-pass filtered signals amplified linearly by driver amps 126a and 126b; in the future when extremely low-drive voltage InP MZIs are commonly commercially used instead of LN MZIs, or the driver amps are integrated inside the MUX chip 124, these driver amps may not be required.

It should be noted that in the exemplary embodiments disclosed herein, driver amplifiers with a small group delay variation (such that a 20~28 Gb/s signal is not distorted) should be used. The low-pass filtered and amplified signals then drive respective tunable 10 Gb/s transmitters 127a, 127b.

As for the tunable 10 Gb/s transmitters, it should be noted that FIG. 1A shows two tunable laser assemblies (ITLAs), though one integrated ITLA could be used to produce both carrier wavelengths if a wavelength separator or the like is employed. Further, FIG. 1B shows various implementations of the tunable 10 G/s transmitters 127a, 127b. In a first variation, an ITLA 128a can be coupled to a 10 G/s LN MZI 128b. In a second variation, a mini- or micro-ITLA 128a can be coupled to a 10 G/s InP MZI. In a third variation, an integrated InP chip 128 that has both a tunable laser and an MZI is employed. Polymer-based optical modulators can also be used. In all cases of FIG. 1B, the modulators can be zero-chirp or pre-chirped.

The modulated optical outputs from the 10 Gb/s MZIs 127a, 127b are then coupled in to an optical fiber via a 2×1 optical coupler or polarization-maintaining beam combiner (PMBC) 129. On the receive side of the 300 pin 2×(20~23) Gb/s module is a 1×2 array waveguide (AWG) slicer 130, such as a 1×2 cyclic array waveguide with a cycle of 50 GHz, for example, that receives the optical signal from a optical fiber or the like and split into two signals. Each received and separated signal is feed into a respective 20 Gb/s receiver 131a, 131b and then onto an electronic dispersion compensators (EDC) or equalizers 132a, 132b. Note that the 20 Gb/s receiver should be broadly understood to have an amplitude and flat group-delay bandwidth higher than that of a 10 Gb/s receiver, but whether the bandwidth is 18 GHz or 12 GHz, for instance, depends on the effectiveness of the EDC. Thereafter, the received signals are input into a 2:16 demultiplexer 134, and the demultiplexed signal is then transmitted (via e.g., a SFI5.1SFI5.1 interface and a 300 pin connector 122) to the external FEC 110. The error corrected and decoded signal can then be taken off the host board 100 for use in the larger communications system.

A key component in this particular exemplary implementation is the electronic IC MUX/DEMUX 124, 134, which performs the 16:2 and 2:16 serdes (serialize and de-serialize) function, with an SFI 5.1 interface. As illustrated, it would have a duobinary precoder built therein. But depending on the IC actually used, it may not have a duobinary encoder. If this is the case, the duobinary precoder can be located immediately after the MUX 124.

Note also that the two electronic dispersion compensators (EDCs) 132a, 132b operating at 20~23 Gb/s can be either stand-alone chips, or can be integrated into the 2:16 DEMUX IC 124, 134. The purpose of the EDCs is to further improve the CD and PMD tolerance, and optical filtering tolerance of the 2×20 Gb/s BL-ODB modulation signals. The EDCs can also be used to improve the OSNR performance, for example, by purposely narrowing the bandwidth of the AWG slicer 130 to reduce the noise, and let the EDC to correct the increased inter-symbol-interference (ISI) caused by the narrower AWG slicer bandwidth. If a system does not require these improved CD, PMD, and OSNR performances, the two EDCs do not have to be used.

Figure 2:
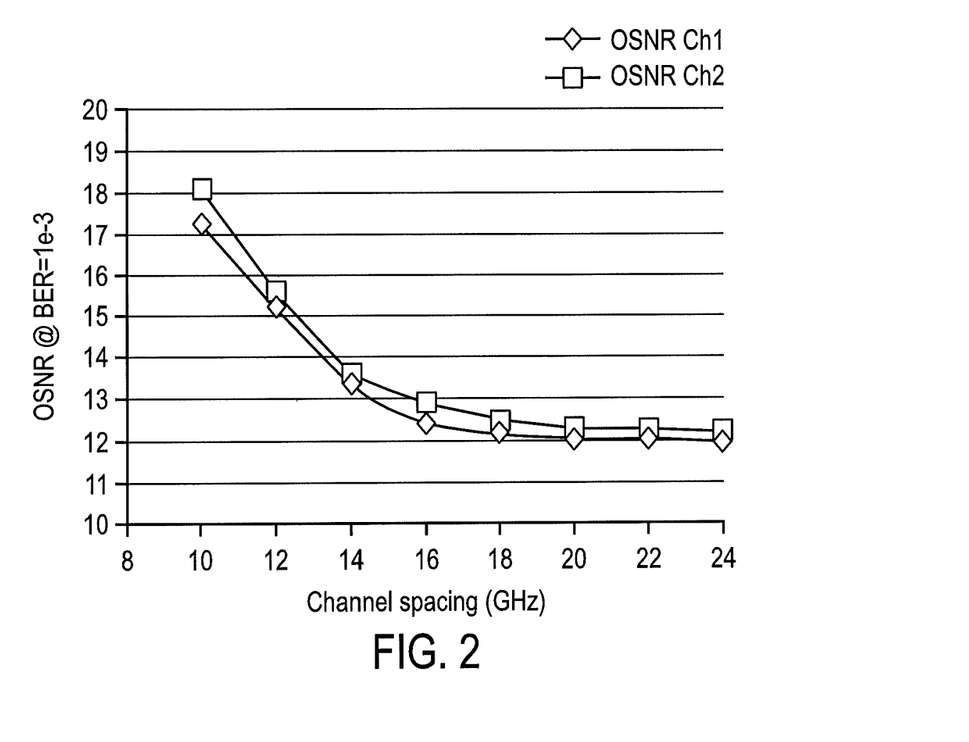
FIG. 2 illustrates exemplary optimum channel spacing between the two optical carriers in FIG. 1A when the two carriers are launched with orthogonal polarizations.

As can be seen, the optical part of the transceiver module 100 illustrated in FIG. 1A is simply a pair of duobinary optical transceivers/transponders, with a 1×2 AWG (array waveguide) device used to separate the two optical carriers spaced between 19~25 GHz in this example. The channel spacing between the two optical carriers depends on whether a polarization-maintaining beam combiner (PMBC) is used or not. In the case when the two optical carriers are launched with orthogonal polarization states, an optimum channel spacing can be found in FIG. 2 to be around 19~20 GHz, as evident from the optical signal to noise ratio (OSNR) vs. channel spacing (in GHz) graph of FIG. 2. Note that in case there is non-negligible polarization-dependent-loss (PDL) in the optical transmission system which causes the received optical power level of the two polarizations to be different, a feedback signaling can be sent from the receiving end to the transmitting end to increase the power of the lower power wavelength so that the power levels at the receiver can be equalized.

Figure 3A:
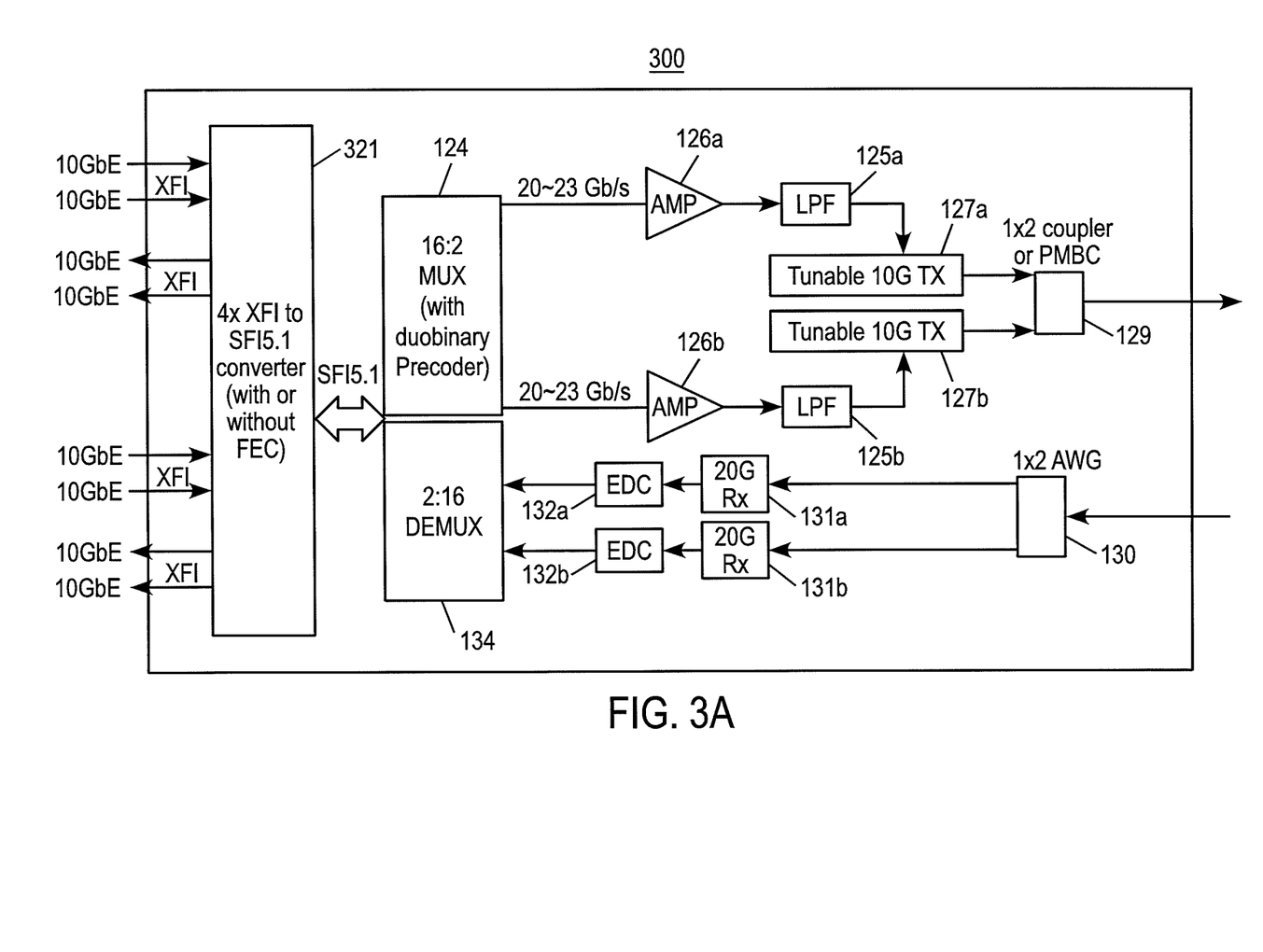
FIGS. 3A, 3B, and 3C illustrate exemplary CFP 2×(20~23) Gb/s modules.

FIG. 3A illustrates an embodiment in CFP package, which is different from the 300-pin package in FIG. 1. A chip 321 that converts 4×XFI to SFI5.1 interface is added before the original 16:2 MUX and 2:16 DEMUX in FIG. 1. This chip may or may not contain the forward-error-correction (FEC) function.

Figure 3B:
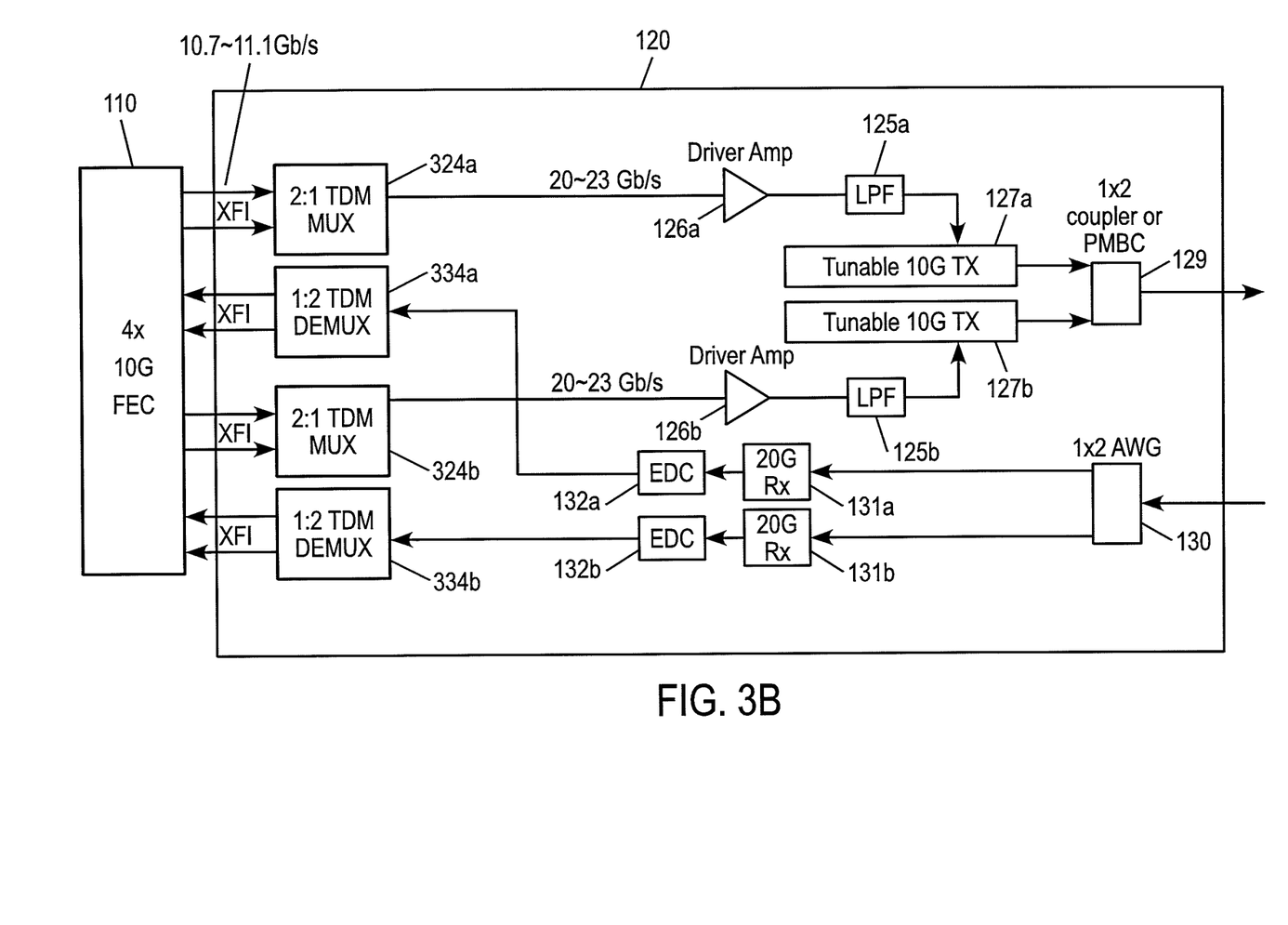

FIG. 3B illustrates another embodiment in CFP package. In FIG. 3B, the original 16:2 MUX 124 and 2:16 DEMUX 134 in FIG. 1 are replaced with pairs of 2:1 TDM (time domain multiplexing) MUXs 324a, 324b, and 1:2 TDM DEMUXs 334a, 334b. Note too that the electrical input interface has been changed from SFI5.1 in FIG. 1 to 4×XFI in FIG. 3B.

In a CFP package, in order to save space, integrated tunable laser assemblies (ITLAs) and 10 G lithium-niobate Mach-Zehnder Interferometer (MZI) 128 in FIG. 1 can be replaced by (a) an integrated single-chip InP laser MZI (3rd variation of FIG. 1B), or (b) a micro- or mini-ITLA 128a in combination with a LN or InP MZI 128b (1st and 2nd variations of FIG. 1B). In addition, owing to the fact that InP MZI should require much less microwave driving power, the power consumption can be reduced further, in the variations shown in FIG. 1B.

Figure 3C:
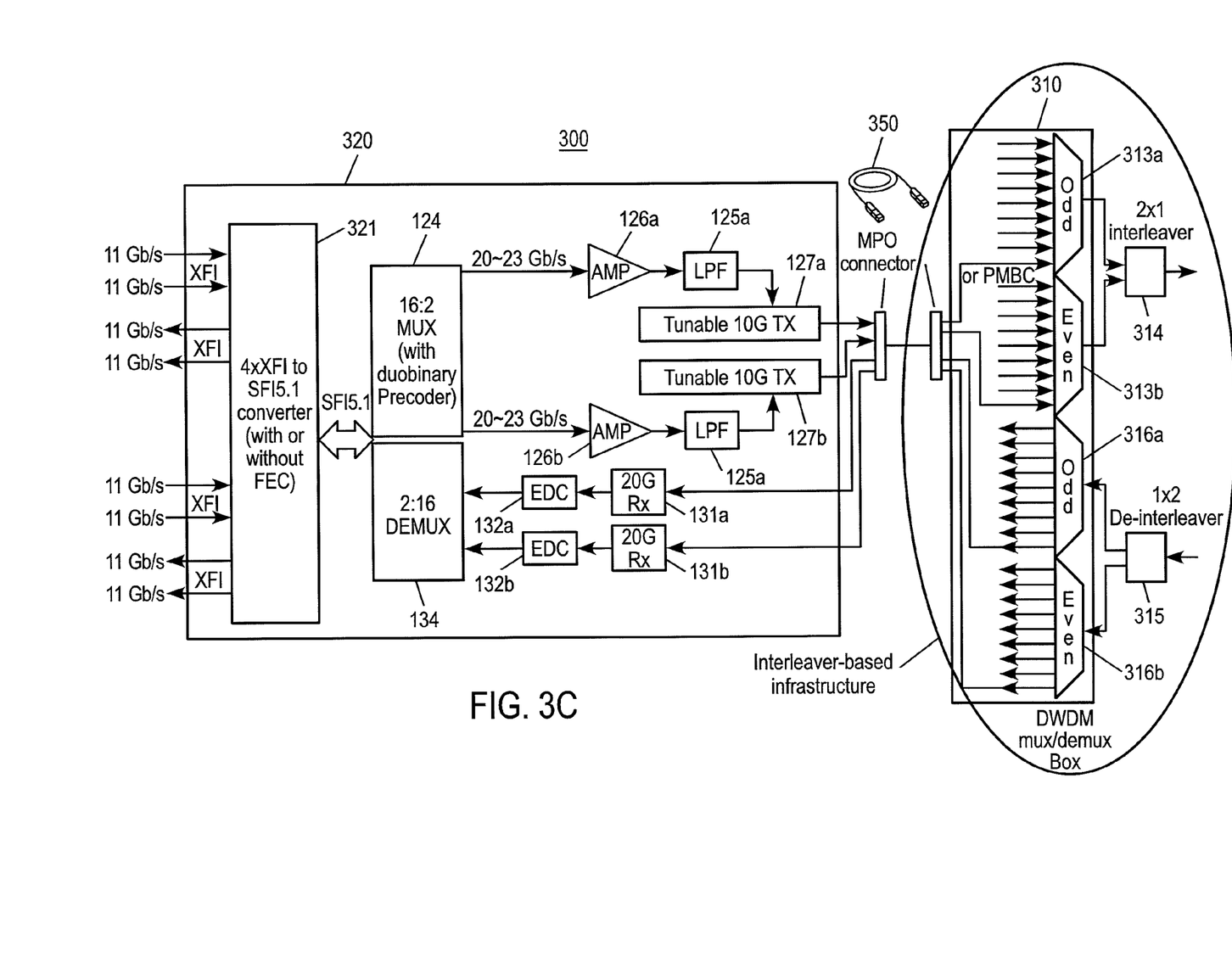

In the example of FIG. 3A and 3C, the duobinary precoders are incorporated in an IC chip that provides the MUX 124. In the example of FIG. 3B, the duobinary precoders are incorporated in the IC chips 324a and 324b that provides 2:1 MUX function. Otherwise, the two duobinary precoders should be located right after the 2:1 MUX output ports.

In FIG. 3A and 3C, MUX 124 separates the 40~46 Gb/s signal into two 20~23 Gb/s signals, each separately passing through driver amps 126a, 126ba, then through low pass filters (LPFs) 125a, 125b. The order of the driver amps and low pass filters can be reversed, and in some embodiments these driver amps may not be required. The low-pass filtered and amplified signals then drive respective tunable 10 Gb/s TX 127a, 127b. Arrangements such as variations (2) and (3) in FIG. 1B are small enough to fit into the CFP MSA module 320 in this exemplary embodiment. Variation (1) could be used if the components are made to fit into this space. The output carrier waves from the tunable 10 G TX 127a, 127b are modulated in accordance with the low-pass filtered and amplified signal by the 10 Gb/s MZIs in this exemplary embodiment.

Note that the arrangement in FIG. 1B, variations (2) and (3) implies that the InP-based MZI allows duobinary modulation, i.e., the optical power-to-bias voltage transfer function is symmetrical with respect to the zero bias voltage.

In FIG. 3C, The modulated optical outputs the tunable 10 G TX 127a, 127b are then transmitted via a MPO jumper connector 350 to an external DWDM MUX/DEMUX box 310. The external DWDM MUX/DEMUX box 310 is connected to a 1×2 25/50 GHz interleaver 314, that receives the optical signal from the external DWDM MUX/DEMUX box 310 and combines them into an optical fiber constituting the transmission link. In this configuration, the two wavelengths generated the tunable 10 G TX 127a, 127b are called "even" and "odd" channels, respectively. They need to be separated by 25 GHz in this exemplary embodiment. Each even wavelength is first combined with other >80 even wavelengths via the even multiplexer 313a, and each odd wavelength is first combined with other >80 odd wavelengths via the odd multiplexer 313b. The two groups of even and odd wavelengths are then combined via the interleaver 314.

On the receive side in FIG. 3C, each received optical signal is separated into even and odd wavelengths via the 1×2 de-interleaver 315, and the >80 odd wavelengths are input to the DEMUX 316a and the >80 even wavelengths are input to the DEMUX 316b of the external DWDM box 310. An even and an odd wavelengths within the same 50 GHz window are connected to the CFP module 320 via two fibers. Note that for each CFP module 320, there are two input fibers and two output fibers, and to avoid 4 fibers and 8 connectors, a jumper cable containing 4 fibers and two MPO connectors can be used instead (although the 4 fiber connection is still a viable approach). Within the CFP module 320, the respective signals are fed to respective 20 Gb/s receivers 131a, 3131b, and then onto an electronic dispersion compensator (EDC) 132a, 132b. Thereafter, the received signals are input into a 2:16 demultiplexer 329, and the demultiplexed signal is then transmitted (via, e.g., a SF15.1 connector) to the external FEC 321 for output to external hardware (not shown) via 11 Gb/s XFI connectors. A significant advantage of the configuration in FIG. 3C is that the 2×1 combiner and 1×2 AWG wavelength separator are both moved out of the 300 pin MSA module 320, therefore further reducing the cost and saving the space and power consumption of the CFP module.

As shown in FIG. 3C, the 1×2 AWG device 314 is now located between a conventional 40-ch or 80-ch DWDM MUX/DEMUX box 310 and a transmission link. In essence, this embodiment utilizes the cyclic nature of 1×2 AWGs or a free-space de-interleaver to separate the two optical carriers (25 GHz spaced) in every 50 GHz ITU window.

Figure 4A:
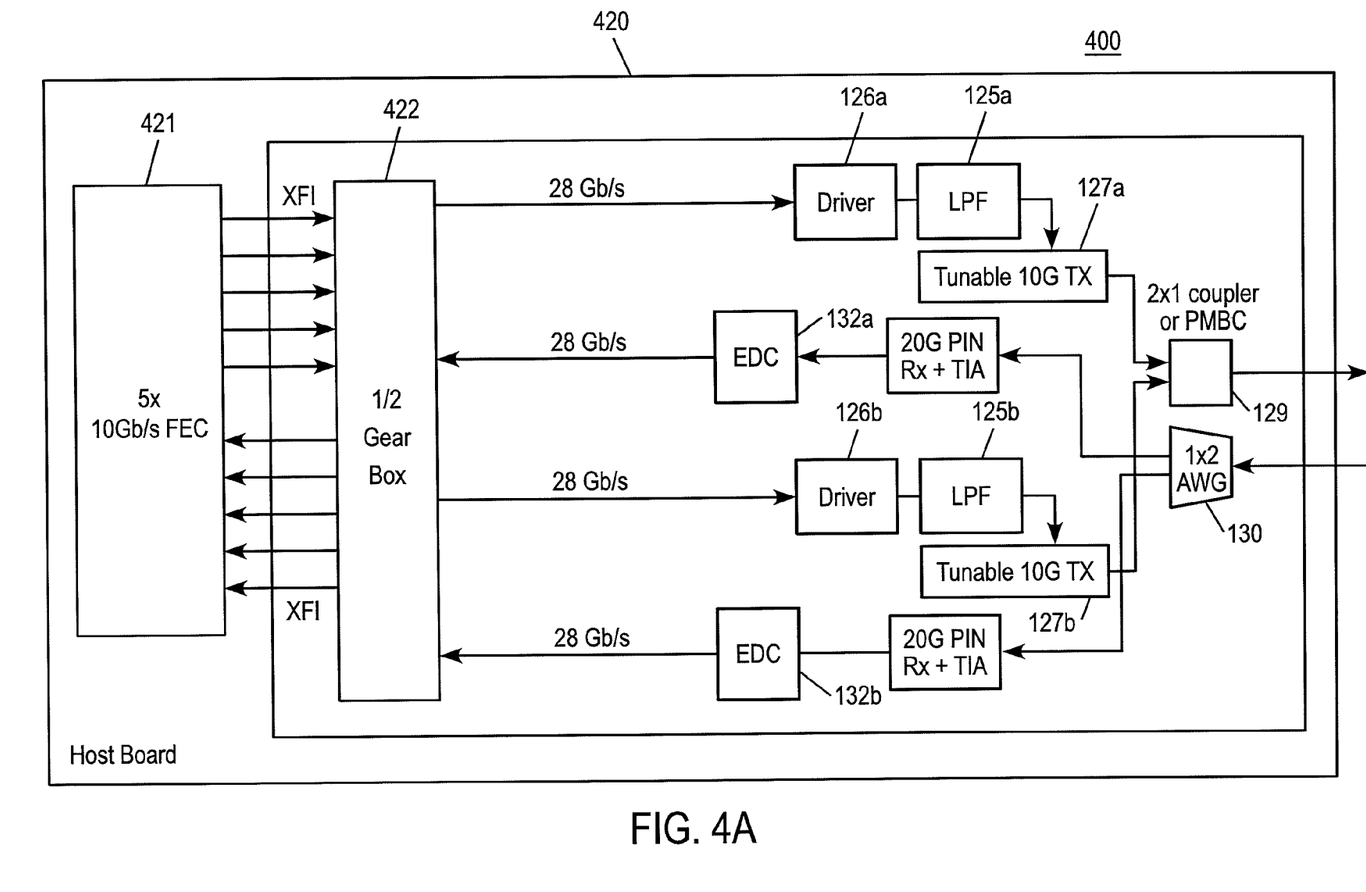
FIGS. 4A and 4B illustrates an exemplary 56 Gb/s (2×28 Gb/s) CFP MSA module with two optical sub-carriers spaced between 19 and 25 GHz.
Figure 4B:
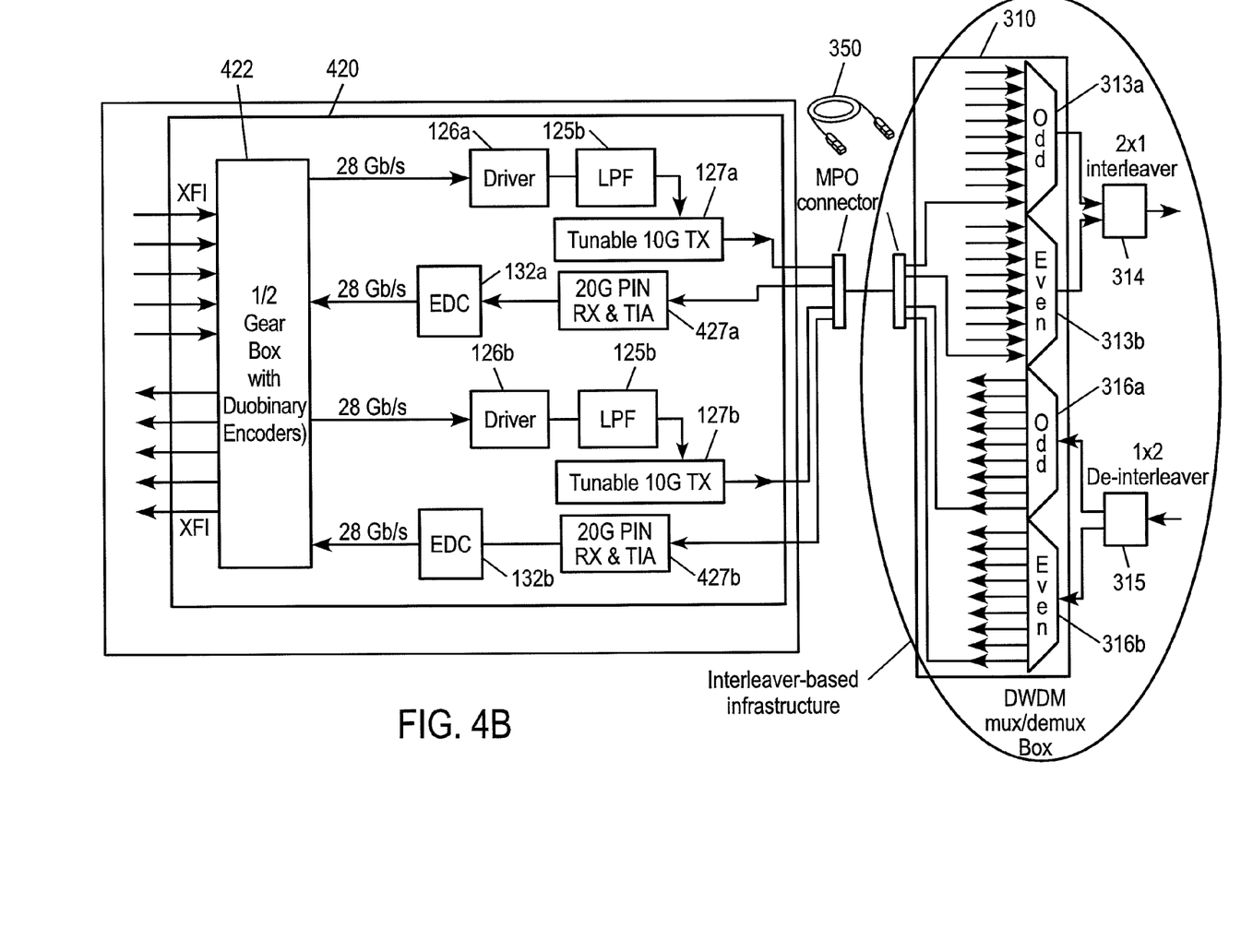

The same principle in FIG. 3A-3C can be applied to the case of a 56 Gb/s CFP module as shown in FIGS. 4A and 4B. In particular, FIG. 4A shows an exemplary hardware and optical configuration of a 56 Gb/s CFP MSA transceiver module 400. As illustrated, on a host board 420 are mounted an external 5 of 10 Gb/s FEC chips 421, electrically connected via standard XFI interface to a gear box 422, this gear box is only half of which is used in a standard 100 Gb/s gear box (and hence "½"), which converts 10×10 Gb/s lines to 4×25 Gb/s lines. Within the module 420, multiplexing and demultiplexing between 5×11 Gb/s and 2×28 Gb/s are performed, similar to the functions performed by MUX/DEMUX 124, 134 as in the embodiment of FIG. 3A. In the example of FIG. 4A, duobinary encoders can be included in the gear box 422, or they can be stand-alone chips immediately after the gear box.

The gear box 422 separates the 56 Gb/s signal into two ~28 Gb/s signals, each separately passing through drivers 126a, 126b, then through low pass filters (LPFs) 125a, 125b. The order of the amplifier and the LPF can be reversed. The signals can be amplified in this embodiment by drivers 126a, 126b with a small enough group delay that a 20~28 Gb/s signal will not be distorted, though in some embodiments these drivers may not be required. The low-pass filtered and amplified signals then drive respective tunable 10 G TX 127a, 127b. Optical signals from respective tunable 10 G TX 127a, 127b, which are small enough to fit into the CFP MSA module 420, are passed through a 2×1 optical coupler or PMBC 129 to the transmission line.

FIG. 4B shows a variation of FIG. 4A. On the transmitter side, there is no 2×1 combiner 129 to combine the two optical wavelengths, and the wavelengths are combined at a 2×1 interleaver 310 outside the CFP module. The operation principle is the same as FIG. 3C.

On the receiver side of FIG. 4B, there is no 1×2 AWG slicer 130, as in FIG. 4A, and the wavelength separation is done in an 1×2 de-interleaver 315 within the DWDM transmission infrastructure. After the 1×2 de-interleaver 315, each received optical signal is separated and input to the DEMUX 316a and 316b of the external DWDM box 310, respectively. An output fiber from the odd-channel DEMUX 316a is connected to a first 20 Gb/s receiver 427a, and an output fiber from the even-channel DEMUX 316b is connected to a second 20 Gb/s receiver 427b. Electronic dispersion compensators (EDCs) 132a, 132b are connected to the 20 Gb/s receivers 427a and 427b, respectively. Thereafter, the received signals are input into the ½ gear box 422, and the resulting demultiplexed signal is then transmitted (via e.g., XFI interface) to the external FEC device (not shown).

A difference between the configurations in FIGS. 3A, 3B, 3C and FIGS. 4A, 4B lies in the first interface chip. In FIGS. 4A and 4B, the first interface chip is now a gear box 422 commonly used to convert 10×10 G to 4×25 G. As used in the exemplary embodiment of FIGS. 4A and 4B, only half of the gear box is used, thus in effect converting 5×11.3 Gb/s electrical signals to 2×28 Gb/s electrical signals. Due to the fact that the gear box 422 does not have FEC functions in this exemplary embodiment (though this would be an alternative implementation), those FEC functions could be sitting on a host board 420.

It is interesting to note that in FIGS. 3A, 3B and 3C, and FIGS. 4A and 4B, each CFP transceiver provides a 56 Gb/s capacity within 50 GHz, and thus 112 Gb/s within 100 GHz can be obtained if two such CFP modules are used. This approach can provide probably the lowest cost of 100 Gb/s capacity in 100 GHz via two hot pluggable CFP modules, as opposed to techniques such as coherent detection, which is structurally more complex, is not as small, consumes more electrical power, and is not hot-pluggable.

Figure 5:
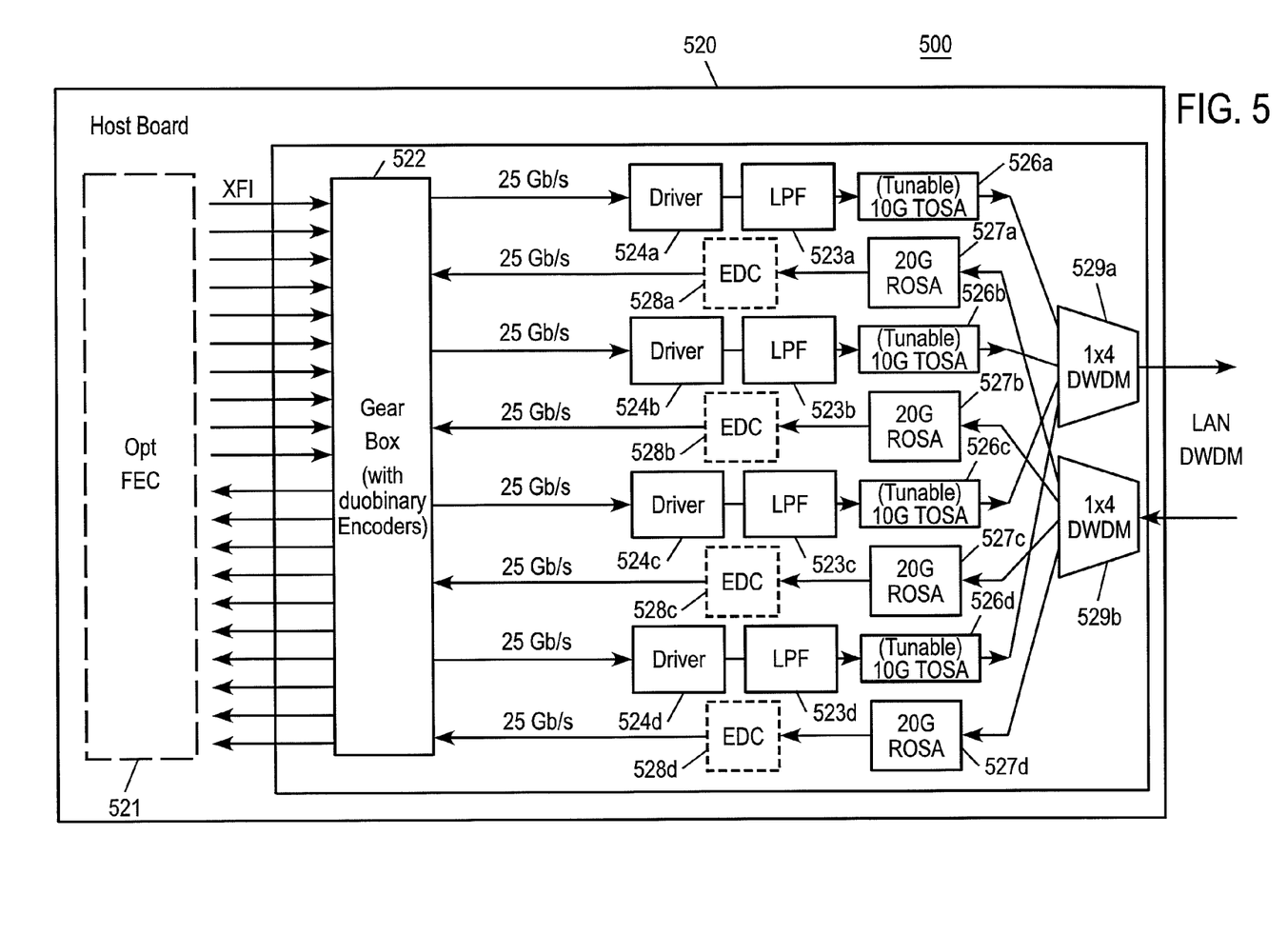
FIG. 5 illustrates an exemplary 100 GbE CFP module using 4×25 Gb/s optical transceivers/transponders, wherein each optical transceiver uses only 10 Gb/s optical modulators and the optical sub-carriers are spaced between 100 and 800 GHz.

FIG. 5 shows the configuration of a client-side 100 Gb/s CFP optical transceiver. It is composed of four T-TOSAs (or fixed wavelength TOSAs) 526a, 526b, 526c, 526d and four ROSAs (receiver optical sub assemblies) 527a, 527b, 527c, 527d. Externally modulated InP MZI are used considering the space constraint if CFP MSA modules are to be used in this exemplary embodiment. Essentially, this embodiment can have four XFP or T-XFP opto-electronic transmitter components placed inside a CFP module 500. Most importantly, this configuration also allows both 4-wavelength MUX and DEMUX be integrated in the same module, which implies that wavelength spacing is at least 100 GHz-spaced so that the 4-wavelength mux/demux is small enough to be accommodated. In this case, a 100 Gb/s transmission requires a bandwidth of 100 GHz×4=400 GHz, which is currently very good for client-side applications. Of course, a FEC 521 could be added if the embodiment of FIG. 5 is used on a line-side application.

In detail, FIG. 5 shows an exemplary hardware and optical configuration of a 100 Gb/s CFP MSA transceiver module 500. As illustrated, on a host board 520 are mounted an external 10×10 Gb/s FEC chip(s) 521 (note that the dashed box implies that this FEC box is normally not required for a client-side CFP application), electrically connected via standard XFI interface to a conventional gear box 522. In the example of FIG. 5, the gear box 522 includes duobinary encoders, but it is possible that this function be incorporated in 4 independent chips at the 4 outputs of the gear box.

The gear box 522 separates the 100 Gb/s signal into four ~25 Gb/s signals, each encoded with a differential encoder (or duobinary precoder), each separately passing through drivers 524a, 524b, 524c, 524d, then through low pass filters (LPFs) 523a, 523b, 523c, 523d (which can be separate filters or different ports of the same LPF). The differential encoder can be included in the gear box, or can be located right at the output port of the gear box as a separate chip. The filtered signals can be amplified in this embodiment by drivers 524a, 524b, 524c, 524d, that have a flat group delay such that 20~28 Gb/s signals will not be distorted, though in some embodiments these drivers may not be required. The low-pass filtered and amplified signals then drive tunable 10 G TOSA's 526a, 526b, 526c and 526d.

The modulated optical outputs from the tunable 10 G TOSA's 526a, 526b, 525c, 525d are then input to a 4×1 DWDM coupler 529a for transmission on a transmission line of for instance a local area network (LAN) DWDM system. Note that the channel spacing between wavelengths in the LAN application does not have to be as dense as 19~25 GHz, rather, it can be as wide as several nanometers.

On the receive side, each received optical signal is separated by a 1×4 DWDM 529b, and the respective signals are fed to respective 25 Gb/s ROSAs 526a, 526b, 526c, 526d, and then onto an optional electronic dispersion compensators (EDC) 528a, 528b, 528c, 528d. Thereafter, the received signals are input into the gear box 522, and the resulting demultiplexed signals are then transmitted (via, e.g., XFI interface) to the host board. In a LAN application, normally the host board does not have an FEC device. However, if there is a need for longer distance transmission, an optional FEC can be also added. In that case, due to the FEC overhead, the data rate per lane will be increased from 25 Gb/s to ~28 Gb/s.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. An N-carrier optical wavelength division modulator (WDM) transponder/transceiver, comprising:
   at least one pair of 10 Gb/s optical transmitters whose wavelengths are within a 50 or 100 GHz ITU-T window; and
   an opto-electronic control circuit driving each optical transmitter, wherein said opto-electronic control circuit includes a multiplexer outputting a control signal, wherein each optical transmitter is driven by the electrical control signal output by the opto-electronic control circuit according to a band-limited optical duo binary modulation technique at 20~28 Gb/s, wherein said opto-electronic control current further comprises:
   at least one electronic device to convert a signal from an interface to N lanes of 20~28 Gb/s differentially-encoded NRZ signals;
   N driver amplifiers to amplify the N lanes of 20~28 Gb/s NRZ signals, respectively, wherein the group delay variation of each amplifier is low enough so as not to distort the 20~28 Gb/s NRZ signals; and
   N electronic low-pass filters receiving the amplified signals and serving as duobinary encoders; and
   wherein said at least one pair of 10 Gb/s optical transmitter further comprise:
   N 10 Gb/s optical transmitters converting the encoded signals into optical signals having N different wavelengths; and
   an optical combiner to combine the N wavelengths generated from the N 10 Gb/s optical transmitters, and
   wherein said
   electronic device has sufficient electronic buffer to manage a skew between the 20~28 Gb/s lanes.

2. An N-carrier optical wavelength division modulator (WDM) transponder/transceiver in accordance with claim 1, wherein the 10 Gb/s optical transmitters contains a standard or miniaturized integrated tunable laser assembly (ITLA).

3. An N-carrier optical wavelength division modulator (WDM) transponder/transceiver in accordance with claim 1, wherein the 10 Gb/s optical transmitters contains a tunable or fixed-wavelength transmitter optical subassembly (TOSA).

4. An N-carrier optical wavelength division modulator (WDM) transponder/transceiver in accordance with claim 1, wherein each tunable 10 Gb/s optical transmitter contains a zero-chirp or pre-chirped lithium-niobate, or InP, or polymer-based optical modulator.

5. An N-carrier optical wavelength division modulator (WDM) transponder/transceiver in accordance with claim 1, wherein the optical combiner is a polarization maintaining beam combiner.

6. An N-carrier optical wavelength division modulator (WDM) transponder/transceiver in accordance with claim 1, wherein the optical combiner is an optical coupler.

7. An N-carrier optical wavelength division modulator (WDM) transponder/transceiver in accordance with claim 1, further comprising at least one pair of 20~28 Gb/s optical receivers, wherein each 20~28 Gb/s receiver contains at least one 20~28 Gb/s electronic dispersion compensator (EDC).

8. An N-carrier optical wavelength division modulator (WDM) transponder/transceiver in accordance with claim 1, wherein the at least one electronic output device that converts N lanes of 20~28 Gb/s NRZ signals to SFI5.1 or Nx10 G interface contains N 20~28 Gb/s EDCs.

9. A N-carrier optical wavelength division modulator (WDM) transponder/transceiver in accordance with claim 1, wherein the entire transponder/transceiver is contained within one of a 300-pin MSA package or a CFP MSA package.

10. A two-carrier optical wavelength division modulator (WDM) transponder/transceiver, comprising:
    at least one electronic input device to convert a signal from an SFI5.1 interface to two lanes of 20~28 Gb/s differentially-encoded NRZ signals;
    one pair of driver amplifiers to amplify the two lanes of 20~28 Gb/s NRZ signals, respectively, wherein the group delay variation of each amplifier is low enough so as not to distort the 20~28 Gb/s NRZ signals;
    one pair of electronic low-pass filters receiving the amplified signals and serving as duobinary encoders;
    one pair of tunable 10 Gb/s optical transmitters converting the encoded signals into optical signals having two different wavelengths;
    an optical combiner to combine the two wavelengths generated from the two tunable 10 Gb/s optical transmitters;
    an optical wavelength slicer to separate the two wavelengths received from the transmission line;
    one pair of 20~28 Gb/s optical receivers; and
    at least one electronic output device to convert two lanes of 20~28 Gb/s NRZ signals to an SFI5.1 interface.

11. A two-carrier optical wavelength division modulator (WDM) transponder/transceiver in accordance with claim 10, wherein the electronic device has sufficient electronic buffer to manage skew between the two 20~28 Gb/s lanes.

12. A two-carrier optical wavelength division modulator (WDM) transponder/transceiver in accordance with claim 10, wherein the wavelength slicer is a 1 input×2 output cyclic array-waveguide with a cycle of 50 or 100 GHz.

13. A two-carrier optical wavelength division modulator (WDM) transponder/transceiver, comprising:
    at least one electronic input device to convert 4×10 Gb/s XFI interface to two lanes of 20~28 Gb/s differentially-encoded NRZ signals;
    one pair of driver amplifiers to amplify the two lanes of 20~28 Gb/s NRZ signals, respectively, wherein the group delay variation of each amplifier is low enough so as not to distort the 20~28 Gb/s NRZ signals;
    one pair of electronic low-pass filters receiving the amplified signals and serving as duobinary encoders;
    one pair of tunable 10 Gb/s optical transmitters converting the encoded signals into optical signals having two different wavelengths;
    an optical combiner to combine the two wavelengths generated from the two tunable 10 Gb/s optical transmitters;
    an optical wavelength slicer to separate the two wavelengths received from the transmission line;
    one pair of 20~28 Gb/s optical receivers; and
    at least one electronic output device to convert two lanes of 20~28 Gb/s NRZ signals to an SFI5.1 interface.

14. A two-carrier optical wavelength division modulator (WDM) transponder/transceiver in accordance with claim 13, wherein the electronic device has sufficient electronic buffer to manage skew between the two 20~28 Gb/s lanes.

15. A two-carrier optical wavelength division modulator (WDM) transponder/transceiver in accordance with claim 13, wherein the channel spacing between the two optical wavelengths of the two tunable 10 Gb/s optical transmitters is between 19 and 25 GHz.

16. A two-carrier optical wavelength division modulator (WDM) transponder/transceiver, comprising:
    at least one electronic input device to convert 5×10 Gb/s XFI interface to two lanes of 27~28 Gb/s differentially-encoded NRZ signals;

one pair of driver amplifiers to amplify the two lanes of 27~28 Gb/s NRZ signals, respectively, wherein the group delay variation of each amplifier is low enough so as not to distort the 27~28 Gb/s NRZ signals;

one pair of electronic low-pass filters receiving the amplified signals and serving as duobinary encoders;

one pair of tunable 10 Gb/s optical transmitters converting the encoded signals into optical signals having two different wavelengths;

an optical combiner to combine the two wavelengths generated from the two tunable 10 Gb/s optical transmitters;

an optical wavelength slicer to separate the two wavelengths received from the transmission line;

one pair of 27~28 Gb/s optical receivers; and at least one electronic output device to convert two lanes of 27~28 Gb/s NRZ signals to a 5×10 Gb/s XFI interface.

17. A two-carrier optical wavelength division modulator (WDM) transponder/transceiver in accordance with claim 16, wherein the electronic device has sufficient electronic buffer to manage skew between the two 20~28 Gb/s lanes.

18. A two-carrier optical wavelength division modulator (WDM) transponder/transceiver in accordance with claim 16, wherein the optical combiner is a polarization maintaining beam combiner.

19. A four-carrier optical wavelength division modulator (WDM) transponder/transceiver, comprising:

at least one electronic input device to convert 10×XFI interface to four lanes of 25 Gb/s differentially-encoded NRZ signals;

four driver amplifiers to amplify the four lanes of 25 Gb/s NRZ signals, respectively, wherein the group delay variation of each amplifier is low enough so as not to distort the 25 Gb/s NRZ signals;

four electronic low-pass filters receiving the amplified signals and serving as duobinary encoders;

four 10 Gb/s optical transmitters converting the encoded signals into optical signals having four different wavelengths;

an optical combiner to combine the four wavelengths generated from the four 10 Gb/s optical transmitters;

an optical wavelength slicer to separate the four wavelengths received from the transmission line;

four 25 Gb/s optical receivers; and at least one electronic output device to convert four lanes of 25 Gb/s NRZ signals to an 10×XFI interface.

20. A four-carrier optical wavelength division modulator (WDM) transponder/transceiver in accordance with claim 19, wherein the electronic device has sufficient electronic buffer to manage skew among the four 25 Gb/s lanes.

21. A four-carrier optical wavelength division modulator (WDM) transponder/transceiver in accordance with claim 19, wherein the channel spacing between any two neighbor optical wavelengths of the four transmitters is up to a few nanometers.

22. A four-carrier optical wavelength division modulator (WDM) transponder/transceiver in accordance with claim 19, wherein said optical slicer is a 1 input×4 output cyclic array-waveguide with a cycle of 50 or 100 GHz.

23. An N-carrier optical wavelength division modulator (WDM) transponder/transceiver, comprising:

at least one electronic device to convert SFI5.1 or N×XFI interface to N lanes of 10 or 20~23 Gb/s differentially-encoded NRZ signals;

N driver amplifiers to amplify the N lanes of 10 or 20~23 Gb/s NRZ signals, respectively, wherein the group delay variation of each amplifier is low enough so as not to distort the 10 or 20~23 Gb/s NRZ signals;

N electronic low-pass filters receiving the amplified signals and serving as duobinary encoders;

N 10 or 20~23 Gb/s optical transmitters converting the encoded signals into optical signals having N different wavelengths, wherein all N different wavelengths are within one of a 50 GHz window or a 100 GHz window;

N 10 or 20~23 Gb/s optical receivers; and at least one electronic device to convert N lanes of 10 or 20~23 Gb/s NRZ signals back to an SFI5.1 or N×XFI interface, wherein N is an positive integer.

24. An N-carrier optical wavelength division modulator (WDM) transponder/transceiver in accordance with claim 23, wherein the electronic device has sufficient electronic buffer to manage the skew between the N 10 or 20~23 Gb/s lanes.

25. An N-carrier optical wavelength division modulator (WDM) transponder/transceiver in accordance with claim 23, wherein the channel spacing between the N optical wavelengths of the N transmitters is approximately one of 12.5 GHz or 25 GHz.

26. A two-carrier optical wavelength division modulator (WDM) transponder/transceiver, comprising:

at least one electronic input device to convert 4×XFI interface to two lanes of 20~23 Gb/s differentially-encoded NRZ signals;

one pair of driver amplifiers to amplify the two lanes of 20~23 Gb/s NRZ signals, respectively, wherein the group delay variation of each amplifier is low enough so as not to distort the 20~23 Gb/s NRZ signals;

one pair of electronic low-pass filters receiving the amplified signals and serving as duobinary encoders;

one pair of tunable 10 Gb/s optical transmitters converting the encoded signals into optical signals having two different wavelengths;

one pair of 20~23 Gb/s optical receivers; and at least one electronic output device to convert two lanes of 20~23 Gb/s NRZ signals back to 4×XFI interface.

27. A two-carrier optical wavelength division modulator (WDM) transponder/transceiver in accordance with claim 26, wherein the electronic device has sufficient electronic buffer to manage skew between the two 20~23 Gb/s lanes.

28. A two-carrier optical wavelength division modulator (WDM) transponder/transceiver in accordance with claim 26, wherein the channel spacing between the two optical wavelengths of the two transmitters is 25 GHz.

29. A two-carrier optical wavelength division modulator (WDM) transponder/transceiver, comprising:

at least one electronic input device to convert 5×XFI interface to two lanes of 27~28 Gb/s differentially-encoded NRZ signals;

one pair of driver amplifiers to amplify the two lanes of 27~28 Gb/s NRZ signals, respectively; the group delay variation of each amplifier is low enough so as not to distort the 27~28 Gb/s NRZ signals;

one pair of electronic low-pass filters receiving the amplified signals and serving as duobinary encoders;

one pair of tunable 10 Gb/s optical transmitters converting the encoded signals into optical signals having two different wavelengths;

one pair of 27~28 Gb/s optical receivers; and at least one electronic output device to convert two lanes of 27~28 Gb/s NRZ signals back to an 5×XFI interface.

30. A two-carrier optical wavelength division modulator (WDM) transponder/transceiver in accordance with claim 29, wherein the electronic device has sufficient electronic buffer to manage skew between the two 27~28 Gb/s lanes.

31. A two-carrier optical wavelength division modulator (WDM) transponder/transceiver in accordance with claim 29, wherein the channel spacing between the two optical wavelengths of the two transmitters is 25 GHz.

* * * * *